M. J. FASSEL.
RAIN GUARD FOR MOTOR VEHICLES.
APPLICATION FILED AUG. 28, 1919.
1,347,218.  Patented July 20, 1920.
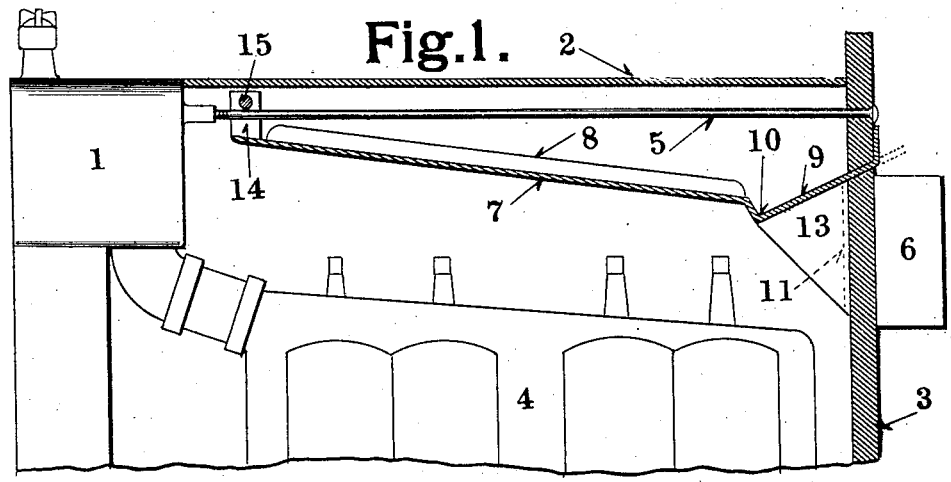
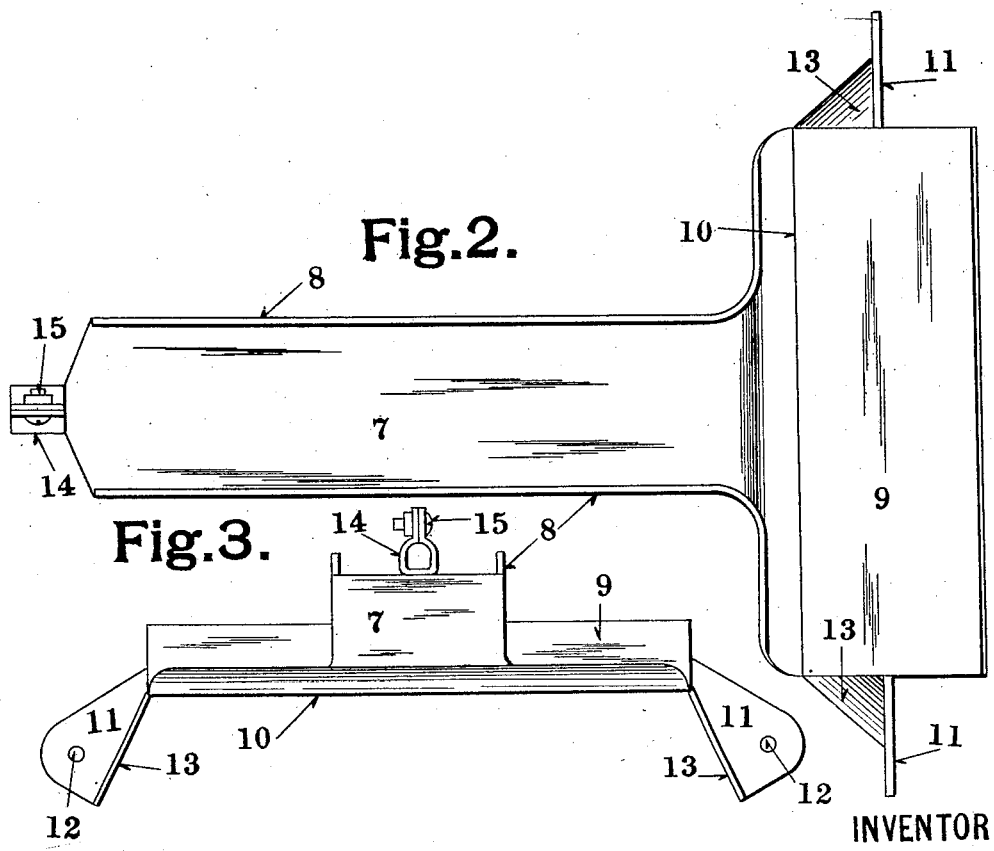
INVENTOR
MARTIN J. FASSEL
BY E. E. Huffman
ATTORNEY

UNITED STATES PATENT OFFICE.

MARTIN J. FASSEL, OF ST. LOUIS, MISSOURI.

RAIN-GUARD FOR MOTOR-VEHICLES.

1,347,218.          Specification of Letters Patent.          Patented July 20, 1920.

Application filed August 28, 1919. Serial No. 320,332.

*To all whom it may concern:*

Be it known that I, MARTIN J. FASSEL, a citizen of the United States of America, residing at the city of St. Louis, State of Missouri, United States of America, have invented a certain new and useful Rain-Guard for Motor-Vehicles, of which the following is such a full, clear, and exact description as will enable any one skilled in the art to which it appertains to make and use the same, reference being had to the accompanying drawings, forming part of this specification.

My invention relates to a rain guard for motor vehicles and more particularly to one for protecting the engine and particularly the spark plugs as well as the coil box from the rain which may pass through the hood or down the inside of the dash.

While my invention is particularly adapted to motor vehicles of the Ford type it may be applied to various other motor vehicles.

In the accompanying drawings which illustrate one form of guard made in accordance with my invention together with a portion of a motor vehicle to which the same is applied, Figure 1 is a vertically longitudinal section showing the guard in position and Figs. 2 and 3 are an enlarged plan view and a front elevation, respectively, showing the guard detached.

1 indicates the radiator, 2 the hood, 3 the dash, 4 the engine, 5 the radiator rod, and 6 the coil box of the motor vehicle; all of which are of well-known form.

7 indicates the sheet of metal which together with a pair of up-turned flanges 8 form a trough which extends over the engine and is inclined from the front to the rear. The part 7 is formed integral with an inclined plane 9 of greater width than the trough 7 adapted to project through an inclined slot formed in the dash, after which the end of the said plane 9 is bent up against the dash 3 as shown in Fig. 1. Formed in the plane 9 at the point of junction with the trough 7 is a lateral discharge channel 10 for draining the water from both the plane and trough. The plane 9 is held in position by means of flanges 11 provided with openings 12 for receiving suitable bolts or screws. 13 are strengthening flanges extending from the flanges 11 to the plane 9. In order to support the forward end of the trough 7, I provide it with an integral upwardly extending loop 14 adapted to open at the top and to pass around the radiator rod 5. After passing around the rod 5, the ends of the loop are secured together by means of bolts 15.

In motor vehicles of the Ford type, the cowl (not shown) is secured against the inner face of the dash 3. The joint between the cowl and the dash usually does not prove to be water-proof and consequently water flows down the inner face of the dash and reaches the coil box 6. In my construction the inner end of the plane 9 which is merely bent up and not secured to the dash intercepts such water as would reach the coil box 6 and carries it out through the slot in the dash through the lateral discharge channel 10 thus effectively protecting this coil box 6.

It will be evident that my device is readily applied to a motor vehicle of the usual type and to effectively protect both the spark plugs of the engine and the coil box from water passing through the hood or down the inner side of the dash.

Having fully described my invention, what I claim as new and desire to secure by Letters Patent of the United States is:

1. The combination with a radiator, engine, hood, and dash, of a motor vehicle, of a rain guard passing through the dash and adapted to intercept the water on the inside of the dash above the coil box and convey the same through the dash, said guard extending over the engine to a point adjacent to the radiator, said guard sloping at both ends to a discharge point intermediate of its ends.

2. The combination with a radiator, engine, hood, dash, and radiator rod, of a motor vehicle, of a rain guard passing through the dash and adapted to intercept the water on the inside of the dash above the coil box and convey the same through the dash, said guard extending over the engine to a point adjacent to the radiator, said guard being supported at its forward end by the radiator rod, said guard sloping longitudinally from both ends to a discharge point intermediate of its length.

3. A rain guard for motor vehicles comprising an inclined plane extending through the dash of a vehicle, said plane being provided with a pair of downwardly extending flanges for securing it to the dash, said guard being provided with a lateral discharge channel for draining the water intercepted by the part of the guard extending through the dash.

In testimony whereof I have hereunto set my hand and affixed my seal.

MARTIN J. FASSEL. [L. S.]